(12) United States Patent
Hattori

(10) Patent No.: US 12,379,986 B2
(45) Date of Patent: Aug. 5, 2025

(54) OPERATION DEVICE AND INFORMATION PROCESSING DEVICE

(71) Applicant: Toshiba Tec Kabushiki Kaisha, Tokyo (JP)

(72) Inventor: Naoyuki Hattori, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 77 days.

(21) Appl. No.: 18/454,699

(22) Filed: Aug. 23, 2023

(65) Prior Publication Data
US 2024/0193030 A1 Jun. 13, 2024

(30) Foreign Application Priority Data
Dec. 13, 2022 (JP) ................................. 2022-198678

(51) Int. Cl.
*G06F 11/07* (2006.01)
*G06F 11/32* (2006.01)
*G06F 16/955* (2019.01)

(52) U.S. Cl.
CPC ...... *G06F 11/0775* (2013.01); *G06F 11/0733* (2013.01); *G06F 11/327* (2013.01); *G06F 16/9554* (2019.01)

(58) Field of Classification Search
CPC ............. G06F 11/0775; G06F 11/0733; G06F 11/0327; G06F 16/9554
USPC ..................................................... 714/48, 57
See application file for complete search history.

(56) References Cited

U.S. PATENT DOCUMENTS

| | | | |
|---|---|---|---|
| 2005/0134893 A1* | 6/2005 | Han ................... | G06F 11/0769 358/1.14 |
| 2015/0002870 A1* | 1/2015 | Burke, Jr. ............ | G06F 3/1268 358/1.13 |
| 2017/0244591 A1* | 8/2017 | Osuki ................ | H04L 41/0253 |
| 2019/0332839 A1* | 10/2019 | Papazian ............. | G06Q 10/107 |
| 2020/0236242 A1* | 7/2020 | Kwak ................ | H04N 1/00896 |
| 2021/0029101 A1 | 1/2021 | Igari | |
| 2021/0224057 A1* | 7/2021 | Zakharov ................. | G06F 8/61 |
| 2022/0317939 A1* | 10/2022 | Okuno ................. | G06F 3/1229 |

* cited by examiner

*Primary Examiner* — Chae M Ko
(74) *Attorney, Agent, or Firm* — Kim & Stewart LLP

(57) ABSTRACT

According to one embodiment, an operation device, such as printer or the like, includes a display screen, a storage unit, and a control unit. The control unit is configured to detect an error of the operation device and generate a code symbol for display on the display screen. The code symbol encodes at least one of information related to the detected error or a URL of a web service associated with the detected error in the storage unit. The web service is provided by a web server. The control unit is further configured to display the generated code symbol on the display screen.

17 Claims, 12 Drawing Sheets

FIG. 7

| ACCESS DATE AND TIME | ERROR CODE | MODEL INFORMATION | SERIAL NUMBER | MOVEMENT DISTANCE | PRINTING SETTING INFORMATION |
|---|---|---|---|---|---|
| xx : xx : xx | a | x | xxx | ccc | fff |
| yy : yy : yy | b | y | yyy | ddd | ggg |
| zz : zz : zz | a | z | zzz | eee | hhh |

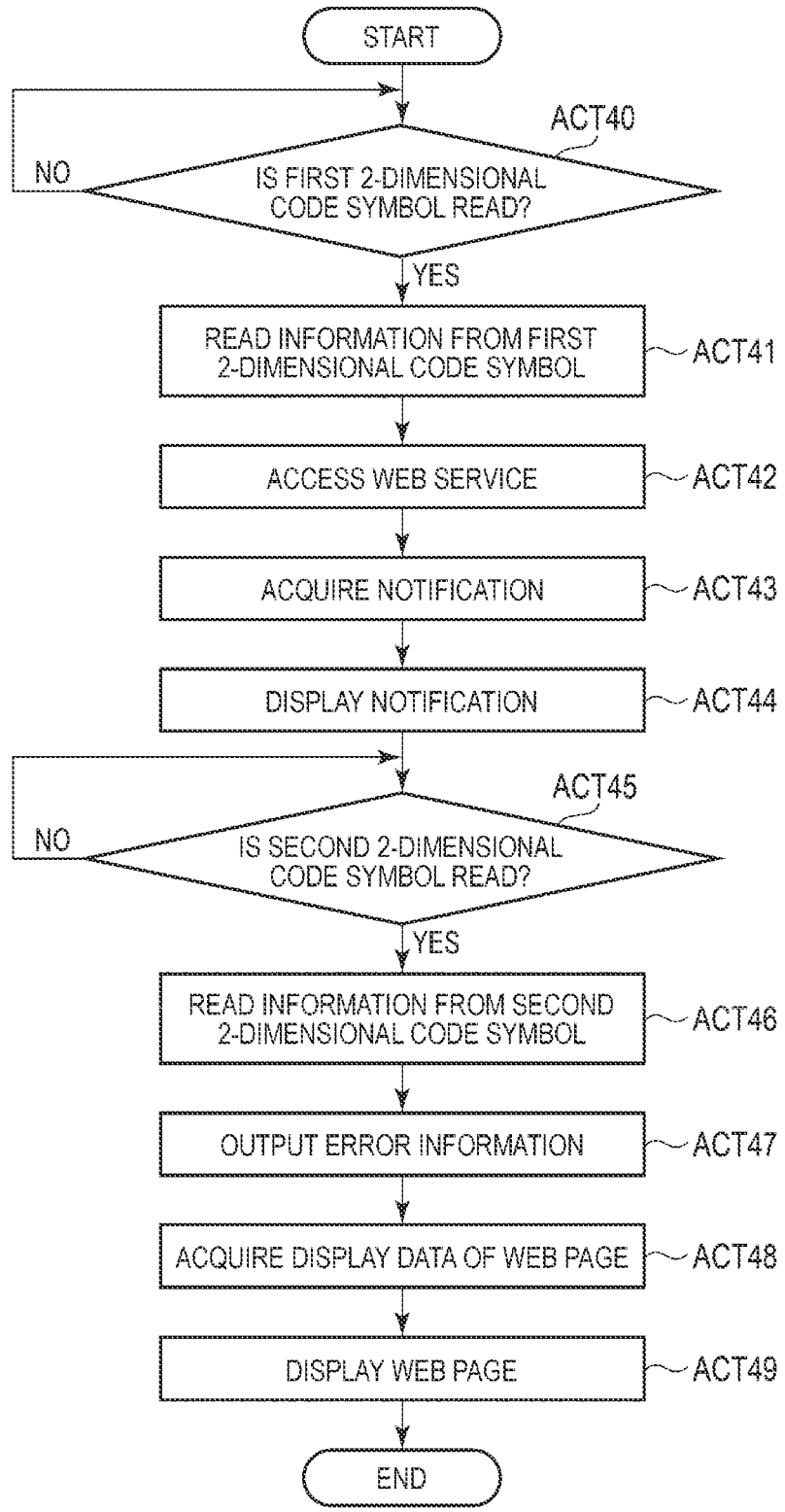

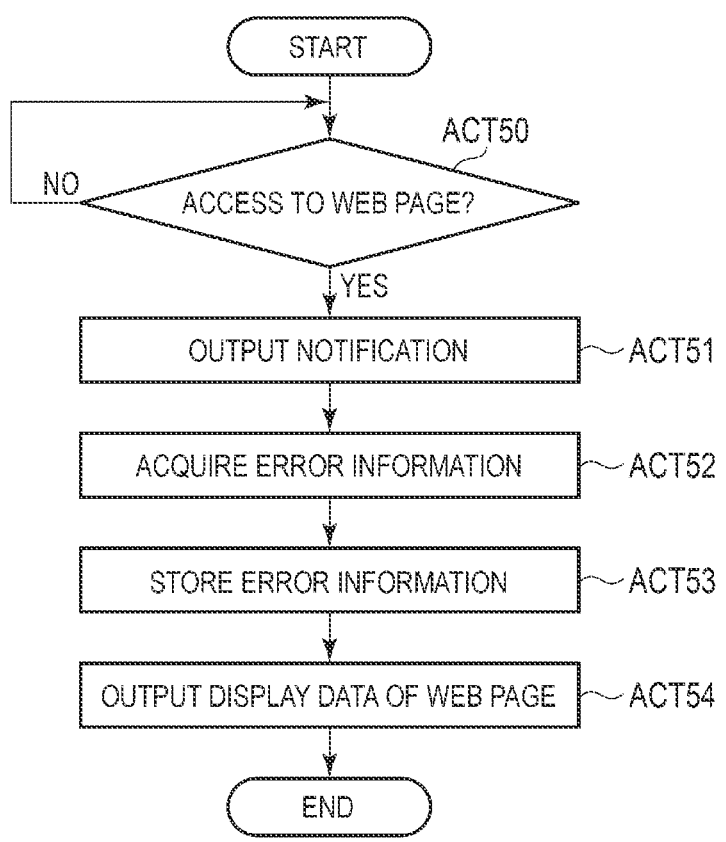

OPERATION DEVICE AND INFORMATION PROCESSING DEVICE

CROSS-REFERENCE TO RELATED APPLICATION

This application is based upon and claims the benefit of priority from Japanese Patent Application No. 2022-198678, filed Dec. 13, 2022, the entire contents of which are incorporated herein by reference.

FIELD

Embodiments described herein relate generally to an operation device, such as a printer or the like, and an information processing device for print systems and the like.

BACKGROUND

Printers may display help screens if an error occurs. For example, a code symbol for a uniform resource locator (URL) for a web-based manual, a telephone number of a support center, a serial number of the printer, and error information such as an error code can be displayed on help screens. Users take countermeasures to correct errors of the printers by reference to the help screens.

For example, users make calls to support centers using the telephone number of a support center displayed on a help screen. The users provide the error information displayed on the help screens to the support center to check countermeasure methods of printers.

As other examples, users read code symbols displayed on help screens using portable terminals and access web services of URLs recorded in the code symbols. The users browse web pages and/or user manuals provided by the web services using the portable terminals and then check countermeasure methods.

In examples in which users make calls to support centers, the users generally have to make calls to the support centers during a limited period of time in which the support centers are open. Therefore, the users may feel it is troublesome to make calls in many cases and thus may not be able to easily check countermeasure methods for curing errors. It is necessary for the support centers to correctly receive and grasp the error information from the users who have made calls. The amount of error information which can be collected by the support centers depends on the number of times users make calls. Therefore, it may be difficult for the support centers to collect error information.

In examples in which users access web services, the users can easily check countermeasure methods for correcting errors by browsing manuals on web pages using portable terminals. However, it is necessary for the users to personally take the time to input error information on the web pages provided by the web services and read the web pages to identify the appropriate countermeasure. Therefore, the users may browse the manuals on the web pages, but might not always input error information on the web pages. Providers of the web services cannot collect the error information unless the users accessing the web services input the error information on the web pages. Therefore, it is difficult for the providers of the web services to collect much information.

BRIEF DESCRIPTION OF THE DRAWINGS

FIG. 7 is a diagram illustrating an example of a data structure of history of error information stored in a server.
FIG. 15 is a flowchart of processing by a portable terminal.
FIG. 16 is a flowchart of processing by a server.

DETAILED DESCRIPTION

Figure 1:
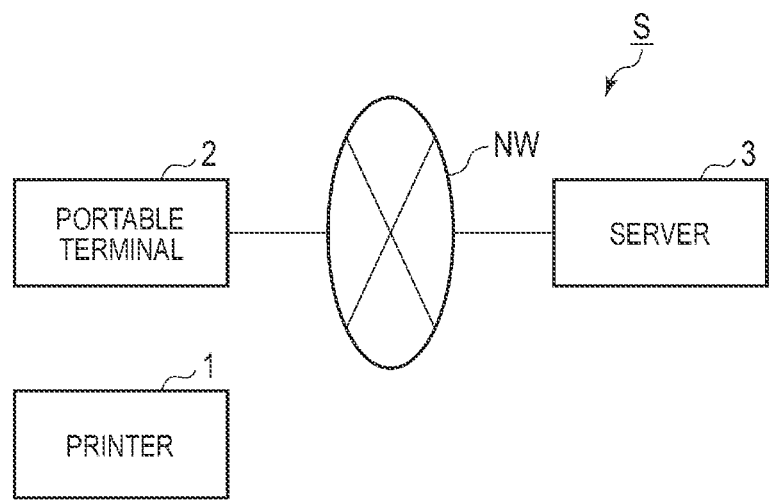
FIG. 1 is a block diagram of a processing system according to a first embodiment.

An exemplary embodiment provides a technology capable of enabling another device to collect information regarding an error occurring in an operation device while checking a countermeasure method for the error using a communication terminal.

In general, according to an embodiment, an operation device includes a display screen, a storage unit, and a control unit. The control unit is configured to detect an error of the operation device and generate a first code symbol for display on the display screen. The first code symbol encodes at least one of information related to the detected error or a URL of a web service associated with the detected error in the storage unit. The web service is provided by a web server. The control unit is further configured to display the generated first code symbol on the display screen.

First Embodiment

A first embodiment will be described with reference to the drawings. In the drawings used to describe the following first embodiment, dimensions, scales, and ratios between components and the like may be appropriately changed. In the drawings certain aspects or elements have been omitted in some cases for representational clarity.

Configuration Example

FIG. 1 is a block diagram illustrating a configuration example of a processing system S.

The processing system S includes a printer 1, a portable terminal 2, and a server 3. The portable terminal 2 and the server 3 are connected to be able to communicate with each other via a network NW. The network NW can comprise one or more networks among various network types including the Internet, a portable communication network, a local area network (LAN), and the like. The LAN may be a wireless LAN or a wired LAN. FIG. 1 illustrates one printer 1, but the processing system S can include a plurality of printers 1. FIG. 1 illustrates one portable terminal 2, but the processing system S can include the plurality of portable terminals 2.

The printer 1 is a device that has a printing function. Printing includes printing of images and/or text. For example, the printer 1 can be a label printer, but may be another type of printer different from a label printer. The printer 1 is any printing device that has a printing function. The printing device is one example of an operation device that may perform various operations other than printing. In this context, an operation may include operations related to motions or machine movements. An operation may comprise processes such as calculations unrelated to machine motions or the like. A configuration example of the printer 1 will be described below as a non-limiting representative of an operation device.

The portable terminal 2 is a device that has a communication function and is portable. For example, the portable terminal 2 is a smartphone, a tablet terminal, or the like, but is not limited thereto. The portable terminal 2 is an example of any communication terminal that has a communication function.

The server 3 is a device that has an information processing function. For example, the server 3 is a web server that provides a web service to the printer 1. The web service for the printer 1 includes a web service related to those errors which might be expected to occur in the printer 1. For example, the web service related to an error provides a web page corresponding to a user manual explaining a countermeasure method for resolving the error. In the example, a URL of a web service related to an error is a URL of a web page indicating a countermeasure method related to the error. One web page may provide a countermeasure method for a single error or countermeasure methods for a plurality of errors. In this context, an error is a fault or malfunction causing the printer 1 not to be able to operate normally. An error may be a hardware error or may be a software error. The server 3 is an example of an information processing device that has an information processing function.

A configuration example of a printer 1 will be described.

Figure 2:
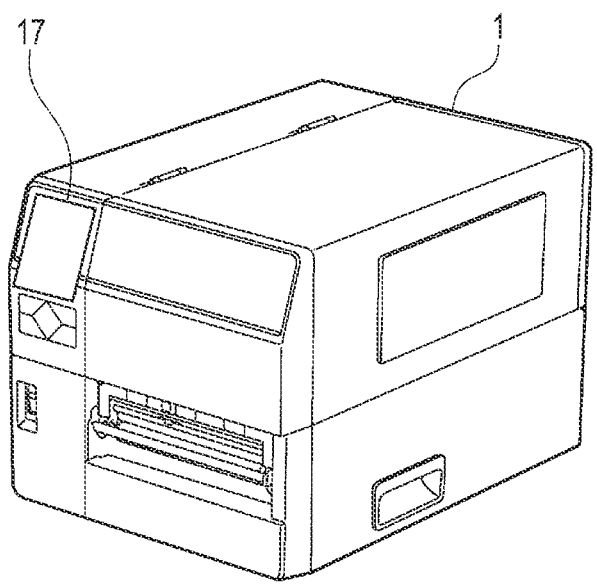
FIG. 2 is an external view of a printer.

FIG. 2 is an external view illustrating a configuration example of the printer 1.

The printer 1 includes a display device 17. The display device 17 can display various images. The display device 17 can be a liquid crystal display or an organic electroluminescence (EL) display, but is not limited thereto. The display device 17 is an example of a display unit of the printer 1.

Figure 3:
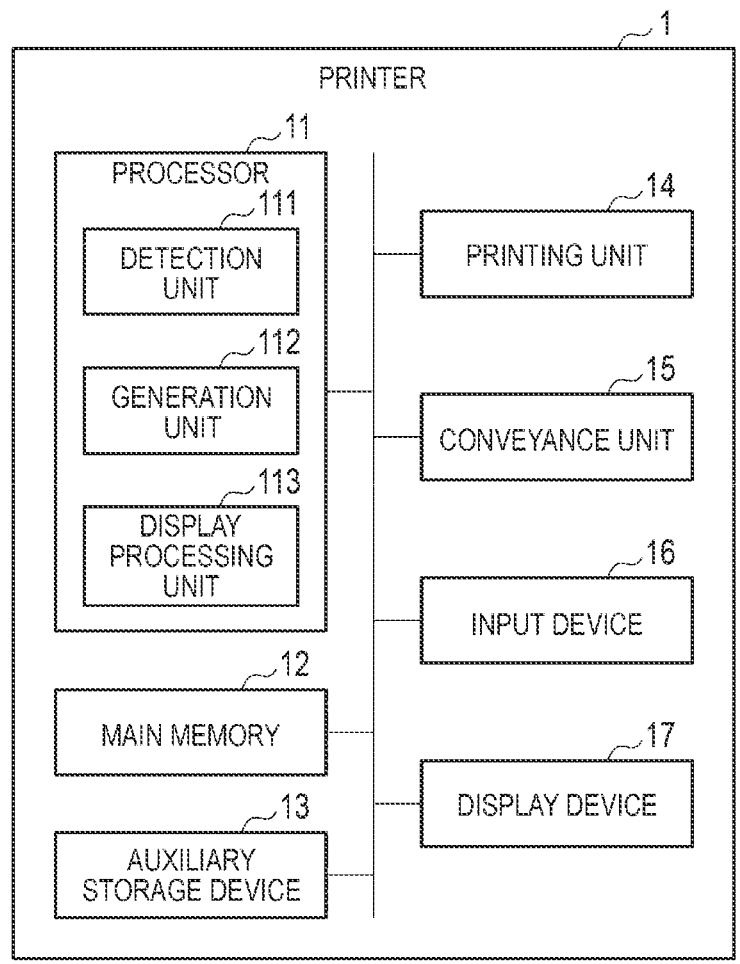
FIG. 3 is a block diagram e of a printer.

FIG. 3 is a block diagram illustrating the printer 1.

In addition to the display device 17, the printer 1 includes a processor 11, a main memory 12, an auxiliary storage device 13, a printing unit 14, a conveyance unit 15, and an input device 16.

The processor 11 provides overall control of the printer 1. The processor 11 can be a processor such as a central processing unit (CPU). The processor 11 may also be configured with various circuits such as an application specific integrated circuit (ASIC), a field programmable gate array (FPGA), and/or a graphics processing unit (GPU) in addition to or instead of the CPU. The processor 11 is an example of a processing circuit of the printer 1. The processor 11 loads a program stored in the main memory 12 or the auxiliary storage device 13 to the main memory 12. In this context, the program is a software program capable of causing the processor 11 to perform a process of each unit implemented by the processor 11, as will be described below. The processor 11 may perform various processes by executing one or more programs loaded to the main memory 12.

The main memory 12 includes a nonvolatile memory area and a volatile memory area. The main memory 12 stores an operating system and/or a program in the nonvolatile memory area. The main memory 12 uses the volatile memory area as a work area where the processor 11 can appropriately rewrite data. For example, the main memory 12 includes a read-only memory (ROM) as the nonvolatile memory area. For example, the main memory 12 includes a random access memory (RAM) as the volatile memory area.

The auxiliary storage device 13 corresponds to an auxiliary storage unit of the printer 1. The auxiliary storage device 13 can be an electric erasable programmable read-only memory (EEPROM®), a hard disk drive (HDD), a solid-state drive (SSD), or a flash memory, or the like, but is not limited thereto. The auxiliary storage device 13 stores the above-described program(s), data used in various processes performed by the processor 11, and data generated through a process of the processor 11.

The auxiliary storage device 13 stores model information of the printer 1. The model information of printer 1 is information indicating a model number of the printer 1 or the like. The auxiliary storage device 13 stores a serial number of the printer 1. The serial number of the printer 1 is a number allocated to uniquely identify the printer 1. The auxiliary storage device 13 also stores a plurality of error codes. Each error code is a code for identifying an error which can occur in the printer 1. The auxiliary storage device 13 stores a printer status of the printer 1. The printer status is information indicating a present status of the printer 1. The printer status may include a movement distance or other accumulated use metric of the printer 1. The movement distance of the printer 1 is a movement distance of a medium that is conveyed in the printer 1 during printing operations. The printer status may include printing setting information of the printer 1. The printing setting information of the printer 1 is information indicating a setting of printing by the printer 1.

The auxiliary storage device 13 stores an URL of a web service related to each error (error code). The URL may be different for each error or may be the same for a plurality of errors.

The printing unit 14 prints an image on a medium. For example, the medium is a sheet of paper or the like. The printing unit 14 includes a head that prints an image on the medium. The head has a function of printing an image on a medium according to printing type and/or medium type. If a medium has a thermosensitive layer, the head may be a type of head for printing an image on a medium that has a thermosensitive layer through heating of heating elements. The head may be a type of head printing for an image on a medium by via an ink ribbon through heating of heating elements. The head may be a type of head for printing an image on a medium by ink jet.

The conveyance unit 15 conveys a medium for printing. The conveyance unit 15 includes a plurality of conveyance rollers. The plurality of conveyance rollers convey the medium as necessary.

The input device 16 is for inputting an instruction based on a user operation. The input device 16 may include a button which can be pressed. The input device 16 may include a touch panel integrated with the display device 17.

A hardware configuration of the printer 1 is not limited to the above-described configuration. In a printer 1, the above-described constituent elements can be omitted and modified and/or additional constituent elements can be added.

Each unit implemented by the processor 11 will be described.

The processor 11 provides the functions of a detection unit 111, a generation unit 112, and a display processing unit 113. Each unit implemented by the processor 11 can also be considered as implemented by a control unit incorporating the processor 11 and the main memory 12.

The detection unit 111 detects an error occurring in the printer 1.

The generation unit 112 generates a code symbol. Here, in the present example, the generation unit 112 generates a 2-dimensional code symbol. The 2-dimensional code symbol is a code symbol in which a URL of a web service to be provided by the server 3 related to an error occurring in the printer 1 is encoded. Hereinafter, information regarding an error occurring in the printer 1 is also called error information. The error information includes various types of information related to an error occurring in the printer 1. The error information may include model information of the printer 1. The error information may include a serial number of the printer 1. The error information may include an error code indicating the error occurring in the printer 1. The error information may include a printer status for the printer 1.

For example, the 2-dimensional code symbol is a QR code symbol, but an exemplary embodiment is not limited thereto. The 2-dimensional code symbol is an example of a code symbol in which information can be recorded.

The display processing unit 113 displays various images on the display device 17.

Figure 4:
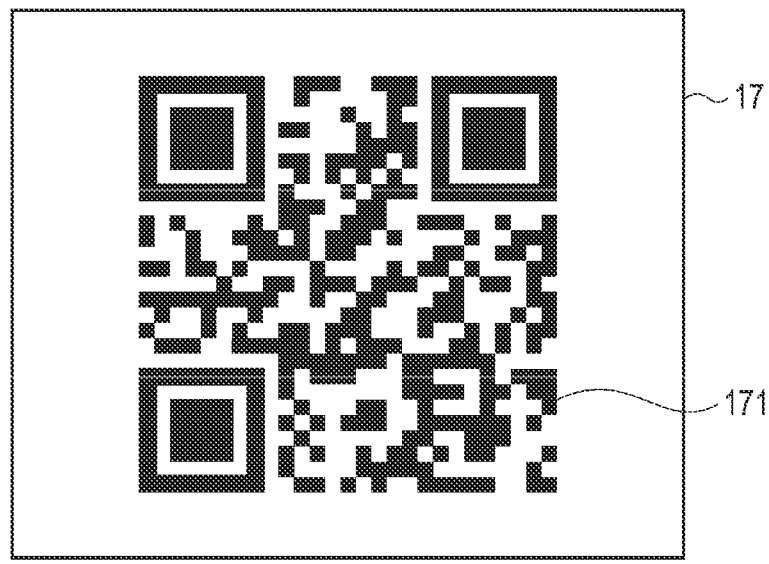
FIG. 4 depicts a 2-dimensional code symbol for a printer.

FIG. 4 is a diagram illustrating a display example of a 2-dimensional code symbol by the printer 1. The display device 17 displays a help screen including a 2-dimensional code symbol 171. The help screen is an image for supporting countermeasures against an error occurring in the printer 1. The display device 17 displays the 2-dimensional code symbol 171 so it can be read by the portable terminal 2.

A configuration example of the portable terminal 2 will be described.

Figure 5:
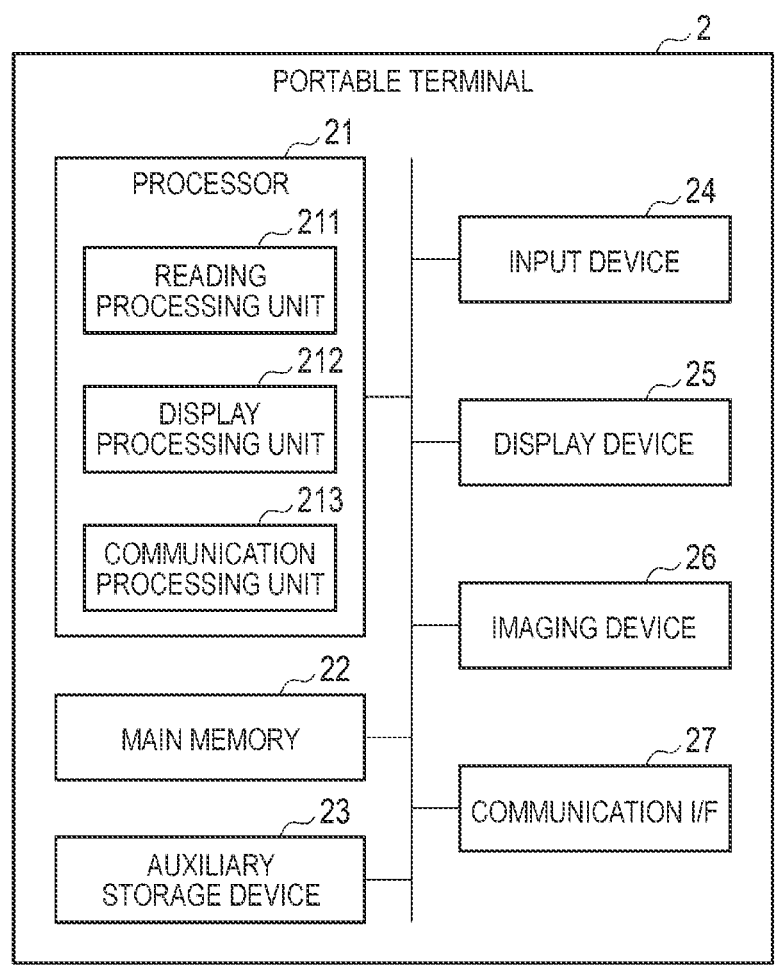
FIG. 5 is a block diagram of a portable terminal.

FIG. 5 is a block diagram illustrating a configuration example of the portable terminal 2.

The portable terminal 2 includes a processor 21, a main memory 22, an auxiliary storage device 23, an input device 24, a display device 25, an imaging device 26, and a communication interface 27. In FIG. 5, an interface is written as "I/F".

The processor 21 may be hardware such as described for the processor 11. The processor 21 loads a program stored in the main memory 22 or the auxiliary storage device 23 to the main memory 22. The program is a software program for causing the processor 21 to perform processing for each function to be described below. The processor 21 performs various processes by executing one or more programs loaded to the main memory 22.

The main memory 22 may be hardware such as described for the main memory 12.

The auxiliary storage device 23 corresponds to an auxiliary storage unit of the portable terminal 2. The auxiliary storage device 23 may be hardware such as described for the auxiliary storage device 13.

The input device 24 is capable of inputting an instruction based on a user operation. The input device 24 may include a button which can be pressed. The input device 24 may include a touch panel integrated with the display device 25.

The display device 25 is capable of displaying various images. The display device 25 may be hardware such as described for the display device 17. The display device 25 is an example of a display unit of the portable terminal 2.

The imaging device 26 is for acquiring image data. For example, the imaging device 26 is a camera. The imaging device 26 is an example of an imaging unit of the portable terminal 2.

The communication interface 27 is an interface for connecting the portable terminal 2 to the server 3 to permit communication via the network NW. The communication interface 27 is an example of a communication unit of the portable terminal 2.

A hardware configuration of the portable terminal 2 is not limited to the above-described configuration. In the portable terminal 2, the above-described constituent elements can be omitted and modified and additional constituent elements can be added.

Each function implemented by the processor 21 will be described.

The processor 21 provides the functions of a reading processing unit 211, a display processing unit 212, and a communication processing unit 213. Each function implemented by the processor 21 can also be considered as implemented by a control unit including the processor 21 and the main memory 22.

The reading processing unit 211 reads a code symbol imaged by the imaging device 26 and reads information recorded in the read code symbol.

The display processing unit 212 displays various images on the display device 25.

The communication processing unit 213 handles communication between the portable 2 and the server 3 using the communication interface 27.

A configuration example of the server 3 will be described.

Figure 6:
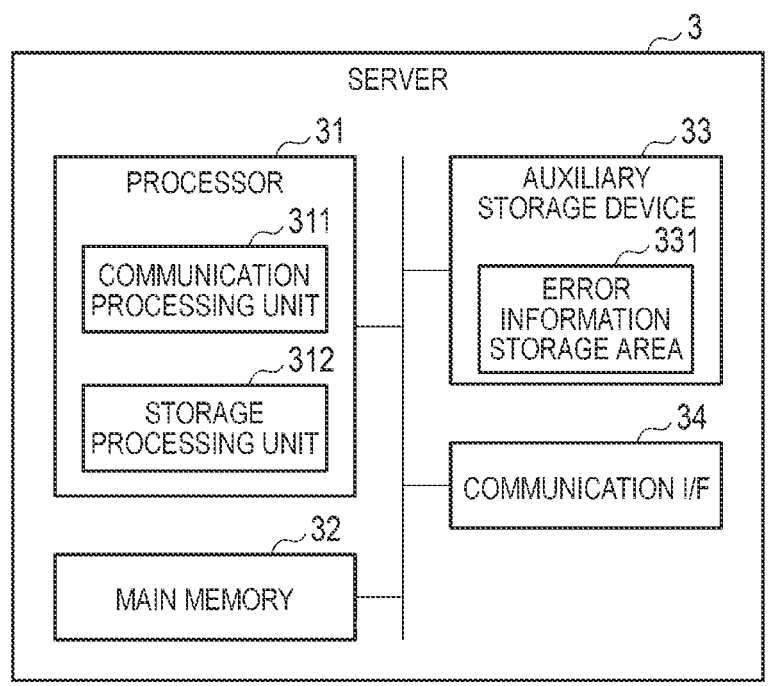
FIG. 6 is a block diagram of a server.

FIG. 6 is a block diagram illustrating a configuration example of the server 3.

The server 3 includes a processor 31, a main memory 32, an auxiliary storage device 33, and a communication interface 34. In FIG. 6, the interface is labeled as "I/F".

The processor 31 may be configured with hardware such as described for the processor 11. The processor 31 loads a program stored in the main memory 32 or the auxiliary storage device 33 to the main memory 32. The program is a software program for causing the processor 31 to perform the described functions of the processor 31. The processor 31 performs various processes by executing one or more programs loaded to the main memory 32.

The main memory 32 may be configured with hardware such as described for the main memory 12.

The auxiliary storage device 33 corresponds to an auxiliary storage unit of the server 3. The auxiliary storage device 33 may be configured with hardware such as described for the auxiliary storage device 13. The auxiliary storage device 33 is an example of a storage unit of the server 3.

The auxiliary storage device 33 includes an error information storage area 331. The error information storage area 331 stores a history of error information.

The communication interface 34 is an interface connecting the server 3 to the portable terminal 2 for communication via the network NW. The communication interface 34 is an example of a communication unit of the server 3.

A hardware configuration of the server 3 is not limited to the above-described configuration. In the server 3, the above-described constituent elements can be omitted and modified and additional constituent elements can be added.

Each function implemented by the processor 31 will be described.

The processor 31 provides the functions of a communication processing unit 311 and a storage processing unit 312. Each function described as implemented by the processor 31 can also be considered implemented by a control unit including the processor 31 and the main memory 32.

The communication processing unit 311 processes communication between the server 3 and the portable terminal 2 using the communication interface 34.

The storage processing unit 312 stores information in the auxiliary storage device 33.

FIG. 7 is a diagram illustrating an example of a data structure of a history of error information stored in the server 3.

The error information storage area 331 stores a history of error information as acquired by the server 3 from a portable terminal 2 via the network NW. The history of the error information includes records of the number of access dates and times. The records include records including error information and access dates and times. The access dates and times are dates and times at which the portable terminal 2 accesses the web services provided by the server 3. The error information associated with the access dates and times is information acquired by the server 3 from the portable terminal 2 based on the accessing by the portable terminal 2 of the web services provided by the server 3. In an example illustrated in FIG. 7, the error information includes an error code, model information, a serial number, a movement distance, and printing setting information. The error information storage area 331 may store a history of the error information divided with regard to every web service related to each error separately. The error information storage area 331 may store a history of the error information collectively with regard to any web service related to an error. The history of the error information is updated whenever the server 3 acquires new error information from a portable terminal 2 via the network NW.

The history of the error information includes a plurality of records including the error information of the same printer 1 for different access dates and times. The error information for the same printer 1 is error information associated with the same serial number. Accordingly, a provider of a web service can identify errors frequently occurring in a printer 1. Since it may be difficult for a user to understand the details of a countermeasure method provided by the web service, the user of the printer 1 is likely to access the web service frequently. Therefore, the provider of the web service can be led to an improvement in the web service.

Operation Example

Next, processes of the processor 11 of the printer 1, the processor 21 of the portable terminal 2, and the processor 31 of the server 3 will be described. It should be noted that the processing order described below is merely exemplary and the described process may be modified in various manners. For example, described steps can be omitted, replaced, or rearranged and additional step may be added and still be an embodiment of the present disclosure.

A process by the processor 11 of the printer 1 will be described.

Figure 8:
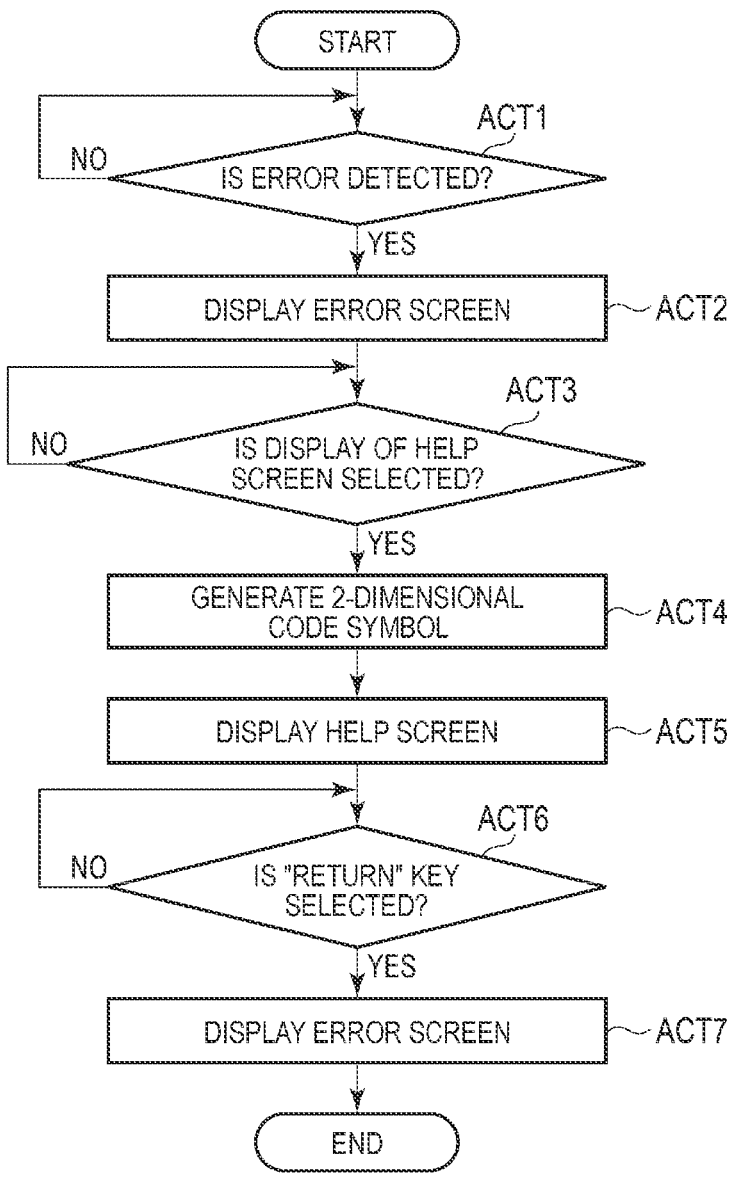
FIG. 8 is a flowchart of processing by a printer.

FIG. 8 is a flowchart illustrating an example of a process by the printer 1.

The detection unit 111 detects an error occurring in the printer 1 (ACT1). In ACT1, the detection unit 111 may detect an error occurring in the printer 1 using various sensors of the printer 1. If the detection unit 111 does not detect an error (NO in ACT1), the detection unit 111 continues or repeats the process of ACT1. If the detection unit 111 detects an error (YES in ACT1), the process transitions from ACT1 to ACT2.

The display processing unit 113 displays the error screen on the display device 17 (ACT2). In ACT2, the display processing unit 113 displays the error screen on the display device 17 based on the detected error occurring in the printer 1 as indicated by the detection unit 111. The display device 17 can display the error screen through the process of the display processing unit 113. The error screen is an image indicating the particular error detected by the detection unit 111.

The generation unit 112 waits for the user to input a display selection instruction for a help screen via the input device 16 (ACT3). The display selection instruction for the help screen is an example of an instruction to generate a 2-dimensional code symbol. The instruction to generate the 2-dimensional code symbol is an example of an instruction to display the 2-dimensional code symbol. If the user does not input the display selection instruction for the help screen via the input device 16 (NO in ACT3), the generation unit 112 continues the process of ACT3. When the user inputs the display selection instruction for the help screen via the input device 16 (YES in ACT3), the process transitions from ACT3 to ACT4.

The generation unit 112 generates the 2-dimensional code symbol based on the input of the display selection instruction for the help screen via the input device 16 from the user (ACT4). In ACT4, the generation unit 112 acquires a URL of a web service related to the error occurring in the printer 1 from the auxiliary storage device 13. The generation unit 112 acquires error information regarding the error from the auxiliary storage device 13. The generation unit 112 generates a 2-dimensional code symbol in which the URL and the error information are encoded based on the acquired URL and error information.

The information encoded in the 2-dimensional code symbol differs according to any differences in the combination of URL and error information. Therefore, the appearance of the 2-dimensional code symbol generally differs depending on the URL and the error information being encoded.

If the error occurring in the printer 1 is an error occurring repeatedly, such as an error indicating there is no paper, the user is highly likely to ascertain the countermeasure method without additional guidance. Here, the user may not even input the display selection instruction for the help screen. Accordingly, it is not necessary for the generation unit 112 to generate the 2-dimensional code symbol.

The display processing unit 113 displays the help screen including the generated 2-dimensional code symbol on the display device 17 (ACT5). The display of the help screen is an example of displaying the 2-dimensional code symbol. The display device 17 can display the help screen including the 2-dimensional code symbol through the processing of the display processing unit 113. As described above, the generation unit 112 generates the 2-dimensional code symbol after an input of the display selection instruction for the help screen. Therefore, it is not necessary for the display processing unit 113 to display the help screen including the 2-dimensional code symbol on the display device 17 whenever an error occurs.

The display processing unit 113 waits for selection of a "Return" key via the input device 16 by the user (ACT6). The selection of the "Return" key is an example of an instruction to transition from display of the help screen to display of an error screen. The instruction to transition from display of the help screen to display of an error screen is an example of an instruction to erase (or end) the display of a 2-dimensional code symbol. If the "Return" key is not selected by the user (NO in ACT6), the display processing unit 113 continues (or repeats) the process of ACT6. When the "Return" key is selected via the input device 16 by the user (YES in ACT6), the process transitions from ACT6 to ACT7.

The display processing unit 113 displays the error screen on the display device 17 (ACT7). In ACT7, the display processing unit 113 displays the error screen on the display device 17 after the help screen displayed on the display device 17 has been erased.

In some examples, the processes of ACT2 and ACT3 may be omitted. In such a case, generation unit 112 generates a 2-dimensional code symbol based simply on the detection of the error in the printer 1 by the detection unit 111. Therefore, the display processing unit 113 displays the 2-dimensional code symbol on the display device 17 whenever an error occurs. Accordingly, the user can omit additional operations for displaying the 2-dimensional code symbol on the display device 17.

A process by the processor 21 of the portable terminal 2 will be described.

Figure 9:
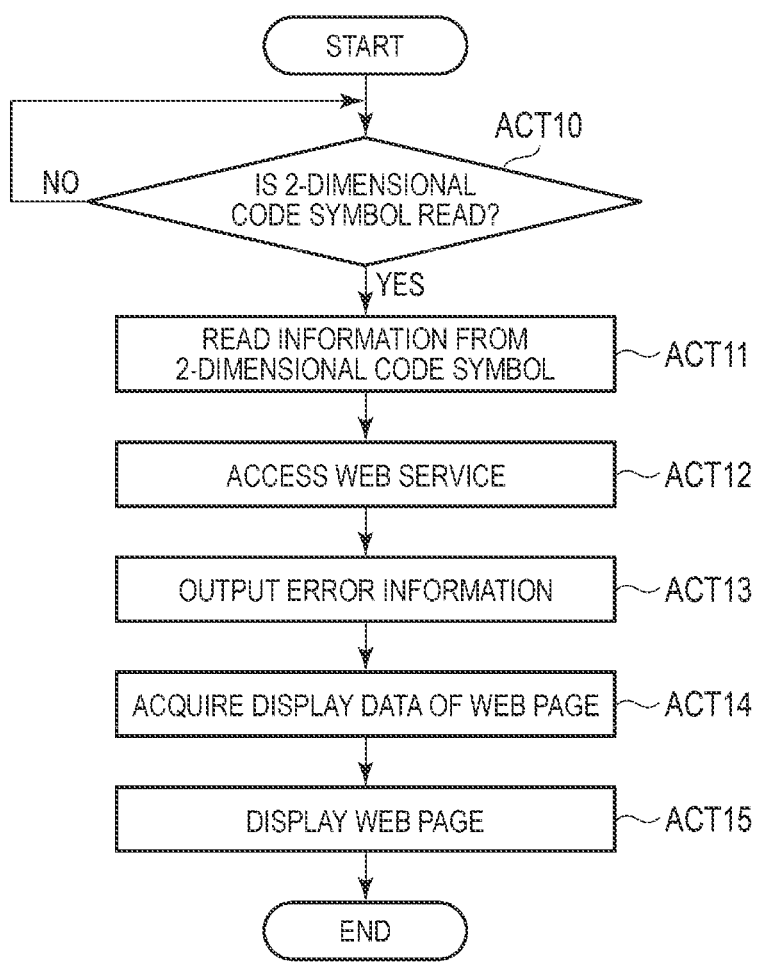
FIG. 9 is a flowchart of processing by a portable terminal.

FIG. 9 is a flowchart illustrating an example of a process by the portable terminal 2.

The reading processing unit 211 reads the 2-dimensional code symbol captured by the imaging device 26 (ACT10). In ACT10, the imaging device 26 captures the 2-dimensional code symbol displayed on the display device 17 of the printer 1. The reading processing unit 211 reads the 2-dimensional code symbol from a captured image. If the reading processing unit 211 does not read the 2-dimensional code symbol (NO in ACT10), the reading processing unit 211 continues or repeats the process of ACT10. If the reading processing unit 211 reads the 2-dimensional code symbol (YES in ACT10), the process transitions from ACT10 to ACT11.

The reading processing unit 211 reads information encoded in the 2-dimensional code symbol (ACT11). In ACT11, the reading processing unit 211 reads the URL of a web service and error information related to the error occurring in the printer 1 from the 2-dimensional code symbol.

The communication processing unit 213 accesses the web service of the URL (as read by the reading processing unit 211) through communication between the portable terminal 2 and the server 3 (ACT12). The communication processing unit 213 may automatically access the web service based on the reading of the URL by the reading processing unit 211. The communication processing unit 213 may access the web service based on an input of an access instruction via the input device 24 by the user after the reading processing unit 211 reads the URL. The communication interface 27 can access the web service of the URL through the communication processing unit 213.

The communication processing unit 213 outputs the error information (as read by the reading processing unit 211) to the server 3 based on the access to the web service (ACT13). The communication interface 27 can output the error information to the server 3 via the network NW through the processing of the communication processing unit 213. The output of the error information to the server 3 includes transmission of the error information to the server 3.

The communication processing unit 213 acquires display data of a web page from the server 3 (ACT14). The communication interface 27 acquires the display data of the web page from the server 3 via the network NW. The acquisition of the display data of the web page from the server 3 includes reception of the display data of the web page from the server 3. For example, the web page is a web page of a manual which is provided by the web service of the URL and describes or explains a countermeasure method for the error occurring in the printer 1.

The display processing unit 212 displays the web page on the display device 25 based on the display data of the web page acquired by the communication processing unit 213 (ACT15). In ACT15, the display device 25 can display the web page through the processing of the display processing unit 212. The user can check the countermeasure method for the error occurring in the printer 1 by viewing the web page displayed on the display device 25.

In some examples, the process of ACT13 may be performed after the process of ACT14 or the process of ACT15.

A process by the processor 31 of the server 3 will be described.

Figure 10:
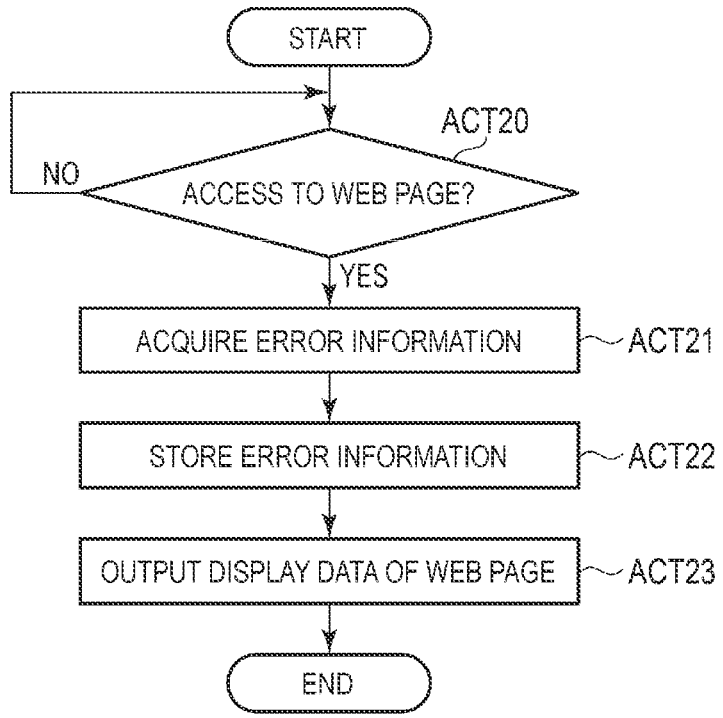
FIG. 10 is a flowchart of processing by a server.

FIG. 10 is a flowchart illustrating an example of a process by the server 3.

The communication processing unit 311 receives the access request of the portable terminal 2 for the web service related to the error occurring in the printer 1 by communication between the server 3 and the portable terminal 2 (ACT20). The web service is a web service associated with the URL read by the portable terminal 2 from the 2-dimensional code symbol that was displayed by the printer 1.

The communication processing unit 311 acquires the error information from the portable terminal 2 based on the access request of the portable terminal 2 (ACT21). The communication interface 34 can acquire the error information from the portable terminal 2 via the network NW through the process of the communication processing unit 311. The error information is information read from the 2-dimensional code symbol by the portable terminal 2. The acquisition of the error information from the portable terminal 2 includes reception of the error information from the portable terminal 2.

The storage processing unit 312 stores the error information acquired by the communication processing unit 311 in the auxiliary storage device 33 (ACT22). In ACT22, the storage processing unit 312 acquires an access date and time for the access request of the portable terminal 2. The storage processing unit 312 stores the records including the access dates and times and the error information to be added to the history of the error information in the auxiliary storage device 33.

The communication processing unit 311 outputs the display data of the web page to the portable terminal 2 (ACT23). The communication interface 34 can output the display data of the web page to the portable terminal 2 via the network NW through the process of the communication processing unit 311. The output of the display data of the web page to the portable terminal 2 includes transmission of the display data of the web page to the portable terminal 2. For example, the web page is a page of a manual and indicates a countermeasure method for resolving the error occurring in the printer 1.

In some examples, the process of ACT23 may be performed before the process of ACT21 or the process of ACT22.

Advantages

An operation device according to the first embodiment includes a generation unit configured to generate a code symbol in which a URL of a web service related to an error occurring in the operation device and provided by a web server and information regarding the error are recorded (encoded). The operation device includes a display processing unit configured to display the code symbol on a display unit.

The user can access the web service only by capturing an image of the code symbol using a communication terminal (e.g., a smartphone). The user can check a countermeasure method for resolving an error occurring in the operation device by accessing the web service using the communication terminal. Therefore, operability of the access to the web service by the user using the communication terminal is maintained. The communication terminal can output information regarding errors to a device providing the web service based on the access to the web service. The device providing the web service can collect the information regarding the errors without requiring a special input by the user. Therefore, the device providing the web service can collect information regarding errors at scale. As such, the operation device can provide user support such that the information regarding errors is output to the device providing the web service without requiring a special input by the user. Accordingly, the operation device can perform support so that another device can collect information regarding the errors while allowing the user to use the communication terminal to check a countermeasure method for resolving the error occurring in the operation device.

The information processing device according to the first embodiment includes a communication processing unit configured to acquire information regarding the error read from a code symbol displayed on the operation device from the communication terminal, based on access of the communication terminal to the web service related to the error. The information processing device includes a storage processing unit configured to store the information regarding the error in a storage unit.

The user can check the countermeasure method for resolving the error in the operation device by accessing the web service using the communication terminal. Therefore, the operability of the access of the user to the web service using the communication terminal is maintained. The information processing device can acquire information regarding the error based on the access to the web service. The information processing device can collect the information regarding the error without requiring any special input by the user. Therefore, the information processing device can collect information regarding errors. Accordingly, while the information processing device can allow the user to check the countermeasure method for resolving an error in the operation device using the communication terminal, the information processing device can collect information regarding the error.

A provider of the web service can ascertain the at least the following by analyzing the information regarding the collected errors. If the information regarding the errors includes an error code, the provider of the web service can ascertain the countermeasure methods to which many accesses are made by users. For example, a frequently accessed countermeasure method may indicate an error which is difficult for the user to resolve or for which the countermeasure method is difficult to understand, which may point to a need for revision. If the information regarding the error includes model information, the provider of the web service can ascertain the models for which many accesses are made by users. If the information regarding the error includes a serial number, the provider of the web service can ascertain a serial number for which many accesses are made by users. The provider of the web service can typically ascertain a manufacture date of the operation device from the serial number. If the information regarding the error includes a printer status, the provider of the web service can ascertain the printer status for which many accesses are made by users. If the information regarding the error includes a movement distance (use metric), the provider of the web service can ascertain whether there is a tendency for the frequency of an error to increase after a certain usage is exceeded. If the information regarding the error includes printing setting information, the provider of the web service can ascertain a printing setting for which the frequency of the error is considerable. A maker of the operation device can be led to make an improvement in a subsequent product through the above-described analysis. The provider of the web service can be led to an improvement in the web service so that information requested by users can be provided more clearly and efficiently.

In the information processing device according to the first embodiment, the storage control unit stores information regarding an error with regard to every web service related to each potential error.

Accordingly, the information processing device can manage the information regarding the errors in association with the web services related to the errors. Therefore, for example, the provider of the web service can perform the above-described analysis for each web page or error.

Second Embodiment

The second embodiment is an embodiment in which two 2-dimensional code symbols are used, unlike the first embodiment in which one 2-dimensional code symbol is used.

Hereinafter, the second embodiment will be described with reference to the drawings. In the drawings used to describe the following second embodiment, scales of units are appropriately changed in some cases. In the drawings used to describe the following second embodiment, configurations are omitted in description in some cases.

Configuration Example

A configuration example of a processing system S according to the second embodiment is similar to the configuration example of the processing system S described with reference to FIG. 1 in the first embodiment.

A configuration example of the printer 1 according to the second embodiment is similar to the configuration example of the printer 1 described with reference to FIGS. 2 and 3 in the first embodiment.

The generation unit 112 generates a first 2-dimensional code symbol. The first 2-dimensional code symbol is a code symbol in which a URL of a web service related to an error occurring in the printer 1 provided in the server 3 is encoded. The generation unit 112 also generates a second 2-dimensional code symbol. The second 2-dimensional code symbol is a code symbol in which error information of the printer 1 is encoded. For example, the first and second 2-dimensional code symbols are QR code symbols, but embodiments are not limited thereto. The first and second 2-dimensional code symbols are examples of code symbols in which information can be recorded.

Figure 11:
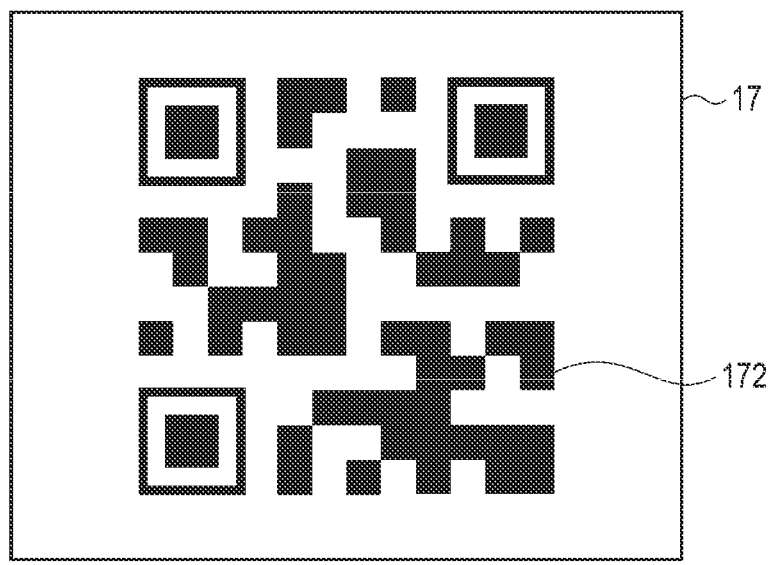
FIG. 11 depicts a first 2-dimensional code symbol for a printer according to a second embodiment.

FIG. 11 is a diagram illustrating a display example of the first 2-dimensional code symbol in the printer 1.

The display device 17 displays a first help screen including a first 2-dimensional code symbol 172. The first help screen is an image for supporting countermeasures for an error occurring in the printer 1. The display device 17 displays the first 2-dimensional code symbol 172 which can be read by the portable terminal 2.

Figure 12:
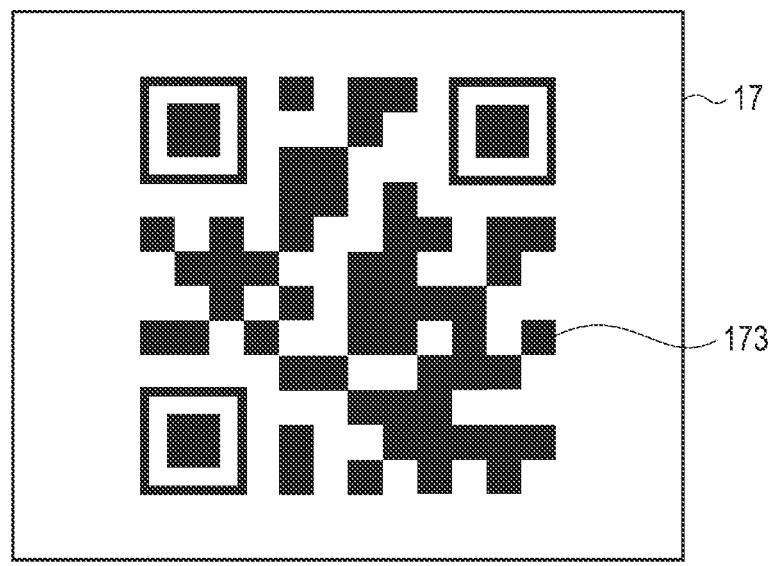
FIG. 12 depicts a second 2-dimensional code symbol for a printer.

FIG. 12 is a diagram illustrating a display example of a second 2-dimensional code symbol in the printer 1.

The display device 17 displays a second help screen including a second 2-dimensional code symbol 173. The second help screen is an image for supporting countermeasures for an error occurring in the printer 1. The display device 17 displays the second 2-dimensional code symbol 173 which can be read by the portable terminal 2.

A configuration example of the portable terminal 2 according to the second embodiment is similar to the configuration example of the portable terminal 2 described with reference to FIG. 5 in the first embodiment.

Figure 13:
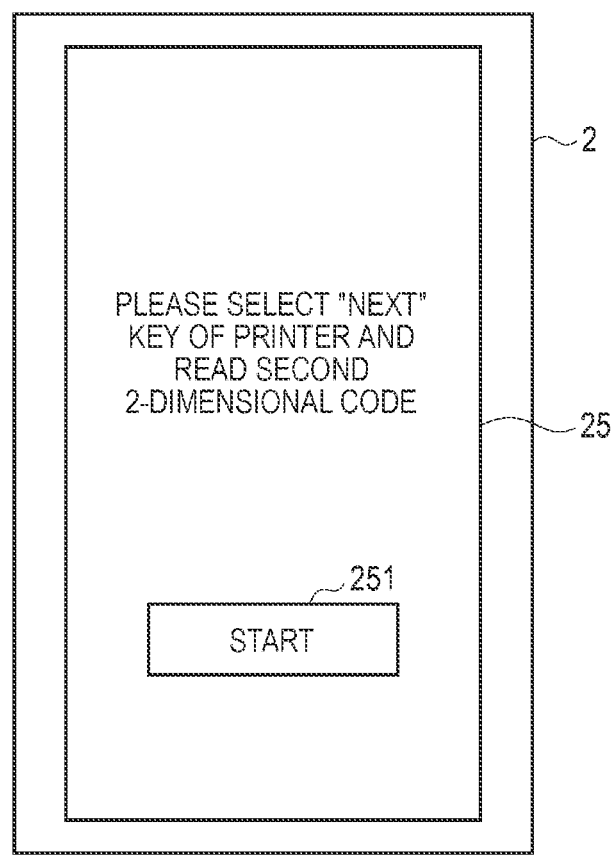
FIG. 13 is a diagram illustrating a display screen example for a portable terminal.

FIG. 13 is a diagram illustrating a display example of the portable terminal 2.

The display device 25 displays a web page including a notification for prompting to read the second code symbol. The notification may include a notification for prompting to input an instruction to select a "Next" key of the printer 1. The instruction to select the "Next" key is an example of an instruction to transition from display of the first help screen to display of the second help screen. The instruction to transition from display of the first help screen to display of the second help screen is an example of an instruction to display the second 2-dimensional code symbol. A web page including the notification may include a "Start" key 251 for inputting an instruction to start the imaging device 26.

A configuration example of the server 3 according to the second embodiment is similar to the configuration example of the server 3 described with reference to FIG. 6 in the first embodiment.

Operation Example

Next, processes of the processor 11 of the printer 1, the processor 21 of the portable terminal 2, and the processor 31 of the server 3 in the second embodiment will be described.

Processing may be modified in various aspects. before example, for the processing described below, steps can be omitted, reordered, replaced, or added.

A process by the processor 11 of the printer 1 will be described.

Figure 14:
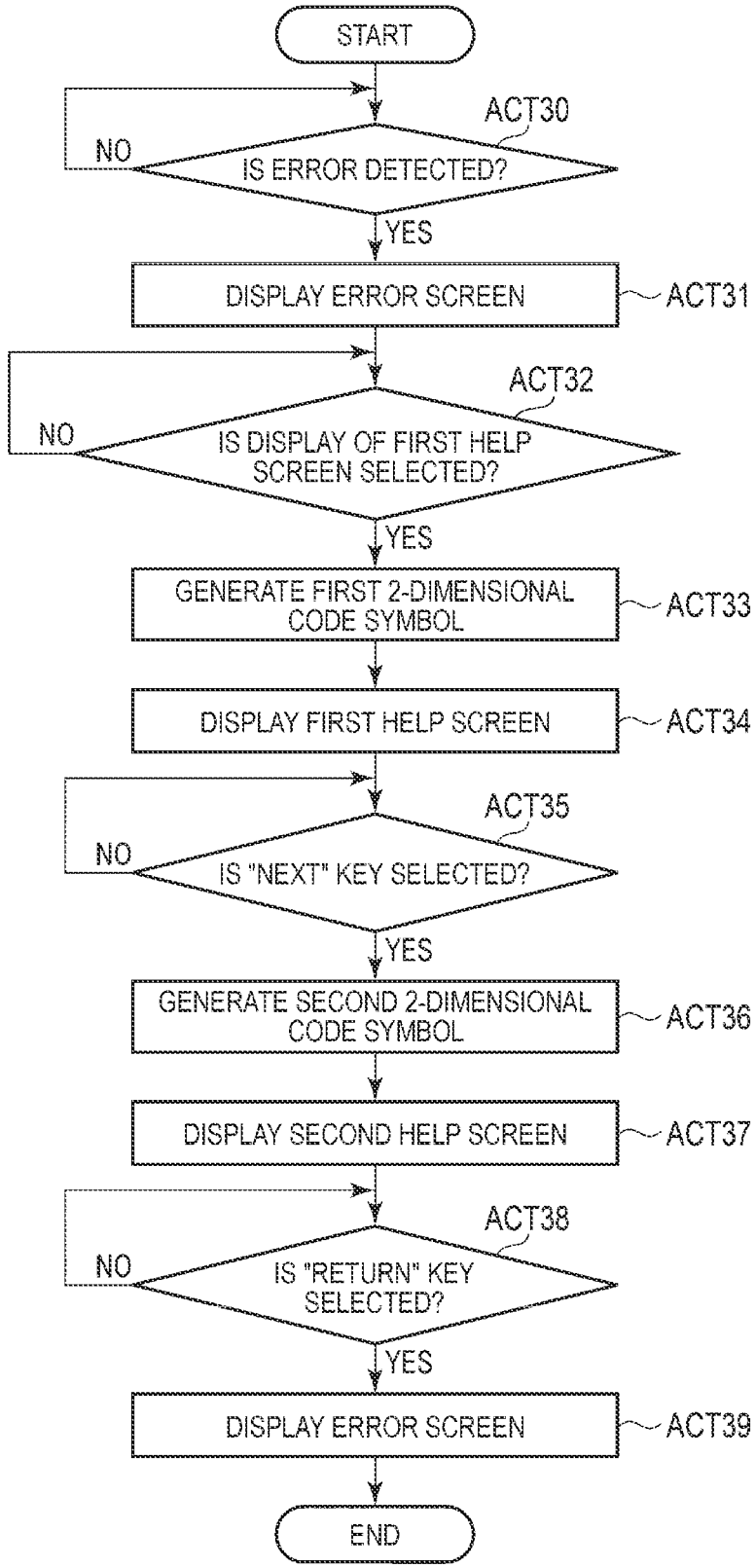
FIG. 14 is a flowchart of processing by a printer.

FIG. 14 is a flowchart illustrating an example of a process by the printer 1.

The detection unit 111 detects an error occurring in the printer 1 (ACT30). In ACT30, the detection unit 111 may detect an error occurring in the printer 1 using various sensors of the printer 1. If the detection unit 111 does not detect an error (NO in ACT30), the detection unit 111 continues or repeats the process of ACT30. If the detection unit 111 detects an error (YES in ACT30), the process transitions from ACT30 to ACT31.

The display processing unit 113 displays an error screen on the display device 17 (ACT31). In ACT31, the display processing unit 113 displays the error screen on the display device 17 based on the detection of the error occurring in the printer 1. The display device 17 can display the error screen through the processing of the display processing unit 113.

The generation unit 112 waits for inputting a display selection instruction for the first help screen from the user via the input device 16 (ACT32). The display selection instruction for the first help screen is an example of an instruction to generate the first 2-dimensional code symbol. The instruction to generate the first 2-dimensional code symbol is an example of an instruction to display the first 2-dimensional code symbol. If the user does not input the display selection instruction for the first help screen from the user via the input device 16 (NO in ACT32), the generation unit 112 continues or repeats the process of ACT32. After the user inputs the display selection instruction for the first help screen via the input device 16 (YES in ACT32), the process transitions from ACT32 to ACT33.

The generation unit 112 generates the first 2-dimensional code symbol (ACT33). In ACT33, the generation unit 112 acquires a URL of a web service related to the error occurring in the printer 1 as detected by the detection unit 111 from the auxiliary storage device 13. The generation unit 112 generates the first 2-dimensional code symbol in which the URL is encoded.

The information encoded in the first 2-dimensional code symbol differs according to the particular URL. Therefore, the appearance of the first 2-dimensional code symbol differs according to the URL.

If the error occurring in the printer 1 is an error occurring repeatedly, such as an error indicating there is no paper, the user is highly likely to ascertain a countermeasure method without additional guidance. Here, the user might not input the display selection instruction of the first help screen. Accordingly, it is not necessary for the generation unit 112 to generate the first 2-dimensional code symbol.

The display processing unit 113 displays the first help screen (including the generated first 2-dimensional code symbol) on the display device 17 (ACT34). The display of the first help screen is an example of the display of the first 2-dimensional code symbol. The display device 17 can display the first help screen including the first 2-dimensional code symbol through the processing of the display processing unit 113. As described above, the generation unit 112 generates the first 2-dimensional code symbol based on an input of the display selection instruction for the first help screen. Therefore, it is not necessary for the display processing unit 113 to display the first help screen including the first 2-dimensional code symbol on the display device 17 whenever an error occurs.

The display processing unit 113 waits for a selection of the "Next" key by the user via the input device 16 (ACT35). If the "Next" key is not selected (NO in ACT35), the display processing unit 113 continues or repeats the process of ACT35. After the "Next" key is selected by the user via the input device 16 (YES in ACT35), the process transitions from ACT35 to ACT36.

The generation unit 112 generates the second 2-dimensional code symbol after the "Next" key is selected by the user via the input device 16 (ACT36). In ACT36, the generation unit 112 acquires error information related to the error occurring in the printer 1 from the auxiliary storage device 13. The generation unit 112 generates the second 2-dimensional code symbol in which the error information is encoded based on the acquired error information.

The information in the second 2-dimensional code symbol differs according to the error information. Therefore, the appearance of the second 2-dimensional code symbol differs according to the particular error information.

The display processing unit 113 displays the second help screen including the generated second 2-dimensional code symbol on the display device 17 (ACT37). In ACT37, the display processing unit 113 displays the second help screen on the display device 17 after the first help screen is erased. The display of the second help screen is an example of display of the second 2-dimensional code symbol. The display device 17 can display the second help screen including the second 2-dimensional code symbol through the processing of the display processing unit 113. The display device 17 can display the second help screen after the first help screen has been erased through the processing of the display processing unit 113.

The display processing unit 113 waits for a selection of a "Return" key by the user via the input device 16 (ACT38). The selection of the "Return" key is an example of an instruction to transition from display of the second help screen to display of an error screen. The instruction to transition from display of the second help screen to display of the error screen is an example of an instruction to erase the display of the second 2-dimensional code symbol. If the "Return" key is not selected by the user via the input device 16 (NO in ACT38), the display processing unit 113 continues the process of ACT38. If the "Return" key is selected by the user via the input device 16 (YES in ACT38), the process transitions from ACT38 to ACT39.

The display processing unit 113 displays the error screen on the display device 17 (ACT39). In ACT39, the display processing unit 113 displays the error screen on the display device 17 after the second help screen displayed on the display device 17 has been erased.

In ACT37, the example in which the display processing unit 113 displays the second help screen on the display device 17 after the first help screen displayed on the display device 17 is erased has been described, but is not limited thereto. The display processing unit 113 may display the second 2-dimensional code symbol on the display device 17 and the display mode of the second 2-dimensional code symbol is not limited. For example, the display processing unit 113 may display the second 2-dimensional code symbol on the display device 17 along with the first 2-dimensional code symbol on the display device 17. In such an example, the display processing unit 113 does not erase the first 2-dimensional code symbol from the display device 17.

In some examples, the processes of ACT31 and ACT32 may be omitted. In such an example, the generation unit 112 generates the first 2-dimensional code symbol based on the detection of the error by the detection unit 111. Therefore, the display processing unit 113 displays the first 2-dimensional code symbol on the display device 17 whenever an error occurs. Accordingly, the user can omit an operation for displaying the first 2-dimensional code symbol on the display device 17.

In some examples, the process of ACT35 may be omitted. For example, the display processing unit 113 may display the second help screen on the display device 17 after a predetermined time passes from the initial display of the first help screen and the first help screen displayed on the display device 17 is erased automatically. Accordingly, the user can omit the selection operation for displaying the second 2-dimensional code symbol on the display device 17. As another example, the generation unit 112 may generate the second 2-dimensional code symbol based on an input of an instruction to select the display of the first help screen from the user via the input device 16. In such an example, the display processing unit 113 may display the second 2-dimensional code symbol on the display device 17 along with the first 2-dimensional code symbol. Accordingly, the user can omit the operation of displaying the second 2-dimensional code symbol on the display device 17 and can also capture the first and second 2-dimensional code symbols at a preferred timing with the portable terminal 2. If the process of ACT35 is omitted, the processes of ACT31 and ACT32 may also be omitted. In such an example, the generation unit 112 generates the first 2-dimensional code symbol based on detection of an error occurring in the printer 1 by the detection unit 111. The generation unit 112 generates the second 2-dimensional code symbol based on detection of an error occurring in the printer 1 by the detection unit 111.

A process by the processor 21 of the portable terminal 2 will be described.

FIG. 15 is a flowchart illustrating an example of a process by the portable terminal 2.

The reading processing unit 211 reads the first 2-dimensional code symbol captured by the imaging device 26 (ACT40). In ACT40, the imaging device 26 captures an image of the first 2-dimensional code symbol displayed on the display device 17 of the printer 1. The reading processing unit 211 reads (decodes) the first 2-dimensional code symbol from the captured image of the first 2-dimensional code symbol. If the reading processing unit 211 does not read the first 2-dimensional code symbol (NO in ACT40), the reading processing unit 211 continues or repeats the process of ACT40. If the reading processing unit 211 reads the first 2-dimensional code symbol (YES in ACT40), the process transitions from ACT40 to ACT41.

The reading processing unit 211 reads information recorded in the first 2-dimensional code symbol (ACT41). In ACT41, the reading processing unit 211 reads the URL of a web service related to the error occurring in the printer 1 from the first 2-dimensional code symbol.

The communication processing unit 213 accesses the web service of the URL through communication between the portable terminal 2 and the server 3 (ACT42). The communication processing unit 213 may automatically access the web service based on the reading of the URL by the reading processing unit 211. The communication processing unit 213 may access the web service based on an input of an access instruction from the user via the input device 24 after the reading processing unit 211 reads the URL. The communication interface 27 can access the web service of the URL through the processing of the communication processing unit 213.

The communication processing unit 213 acquires the display data of the web page including a notification from the server 3 for prompting a user to read the second 2-dimensional code symbol (ACT43). The communication interface 27 can acquire the display data of the web page including the notification from the server 3 via the network NW through the processing of the communication processing unit 213. The acquisition of the display data of the web page including the notification from the server 3 includes reception of the display data of the web page including the notification from the server 3. The acquisition of the display data of the web page including the notification is an example of acquisition of a notification.

The display processing unit 212 displays the web page including the notification on the display device 25 (ACT44). The display device 25 can display the web page including the notification through the processing of the display processing unit 212. The display of the web page including the notification is an example of display of a notification. The user can then image the second 2-dimensional code symbol displayed on the printer 1 with the portable terminal 2 after viewing the notification.

The reading processing unit 211 reads the second 2-dimensional code symbol as captured with the imaging device 26 (ACT45). In ACT45, the reading processing unit 211 starts the imaging device 26. The reading processing unit 211 may start the imaging device 26 based on a selection of a "Start" key 251 by the user via the input device 24. The selection of the "Start" key 251 is an example of an input of an instruction to start the imaging device 26. If the web page including the notification does not include the "Start" key 251, the reading processing unit 211 may automatically start the imaging device 26 based on the display of the web page including the notification. The imaging device 26 captures the second 2-dimensional code symbol displayed on the display device 17 of the printer 1. The reading processing unit 211 reads the second 2-dimensional code symbol from a captured image. If the reading processing unit 211 does not read the second 2-dimensional code symbol (NO in ACT45), the reading processing unit 211 continues or repeats the process of ACT45. If the reading processing unit 211 reads the second 2-dimensional code symbol (YES in ACT45), the process transitions from ACT45 to ACT46.

The reading processing unit 211 reads the information recorded in the second 2-dimensional code symbol (ACT46). In ACT46, the reading processing unit 211 reads the error information from the second 2-dimensional code symbol.

The communication processing unit 213 outputs the error information read by the reading processing unit 211 to the server 3 through the communication between the portable terminal 2 and the server 3 (ACT47). In ACT47, the communication processing unit 213 outputs the error information to the server 3 after the web page including the notification is acquired from the server 3 based on access to the web service. The communication interface 27 can output the error information to the server 3 via the network NW through the process of the communication processing unit 213. The communication processing unit 213 may automatically output the error information to the server 3 based on reading of the error information by the reading processing unit 211. The communication processing unit 213 may output the error information to the server 3 based on an input of an instruction to output the error information from the user via the input device 24 after the reading processing unit 211 reads the error information.

The communication processing unit 213 acquires display data of a web page from the server 3 (ACT48). The communication interface 27 acquires the display data of the web page from the server 3 via the network NW through the processing of the communication processing unit 213. For example, the web page is a web page of a user manual which is provided as the web service and indicates a countermeasure method for the error occurring in the printer 1.

The display processing unit 212 displays the web page on the display device 25 based on the display data of the web page acquired by the communication processing unit 213 (ACT49). In ACT49, the display device 25 can display the web page through the process of the display processing unit 212. The user can check the countermeasure method for the error occurring in the printer 1 by viewing the web page displayed on the display device 25.

In some examples, the process of ACT47 may be performed after the process of ACT48 or the process of ACT49.

FIG. 16 is a flowchart illustrating an example of a process by the server 3.

The communication processing unit 311 receives the access of the portable terminal 2 to the web service related to the error occurring in the printer 1 through communication between the server 3 and the portable terminal 2 (ACT50). The web service is a web service of the URL read from the first 2-dimensional code symbol displayed in the printer 1 by the portable terminal 2.

The communication processing unit 311 outputs the display data of the web page including the notification for prompting reading of the second 2-dimensional code symbol to the portable terminal 2 (ACT51). The communication interface 34 can output the display data of the web page including the notification to the portable terminal 2 via the network NW through the processing of the communication processing unit 311. The output of the display data of the web page including the notification to the portable terminal 2 includes transmission of the display data of the web page including the notification to the portable terminal 2. The output of the display data of the web page including the notification is an example of output of the notification.

The communication processing unit 311 acquires the error information from the portable terminal 2 (ACT52). In ACT52, the communication processing unit 311 acquires the error information from the portable terminal 2 after the display data of the web page including the notification is output to the portable terminal 2. The communication interface 34 can acquire the error information from the portable terminal 2 via the network NW through the processing of the communication processing unit 311. The error information is information read by the portable terminal 2 from the second 2-dimensional code symbol displayed on the printer 1.

The storage processing unit 312 stores the error information acquired by the communication processing unit 311 in the auxiliary storage device 33 (ACT53). In ACT53, the storage processing unit 312 acquires an access date and time for the access of the portable terminal 2 to the web service. The storage processing unit 312 stores the records including the access dates and times and the error information in the auxiliary storage device 33 so that the records are added to the history of the error information.

The communication processing unit 311 outputs the display data of the web page to the portable terminal 2 (ACT54). The communication interface 34 can output the display data of the web page to the portable terminal 2 via the network NW through the processing of the communication processing unit 311.

In some examples, the process of ACT54 may be performed before the process of ACT51, the process of ACT52 or the process of ACT53.

Advantages

The operation device according to the second embodiment includes a generation unit configured to generate a first code symbol in which a URL of a web service related to an error occurring in the operation device provided by a web server is recorded and to generate a second code symbol in which information regarding the error is recorded. The operation device includes a display processing unit configured to display the first code symbol on a display unit and then the second code symbol on the display unit.

The user can access a web service only by capturing a first code symbol using a communication terminal. The user can check a countermeasure method for resolving an error occurring in the operation device using the communication terminal by accessing the web service. Therefore, operability of the access to the web service by the user using the communication terminal is maintained. The user can provide the information regarding the errors to a device providing the web service only by capturing the second code symbol once using the communication terminal. The device providing the web service can collect the information regarding the errors by performing a simple operation of capturing the second code symbol without requiring a special input by the user. Therefore, the device providing the web service can collect information regarding errors. As such, the operation device can perform support so that the information regarding the errors is output to the device providing the web service without requiring a special input by the user while maintaining operability of the access to the web service by the user using the communication terminal. Accordingly, the operation device can perform support so that another device can collect the information regarding an error while allowing the user to check a countermeasure method for the error occurring in the operation device using the communication terminal.

If an URL and information regarding an error are recorded in one code symbol, then the amount of information required to be encoded in the single code symbol increases. Here, since the number of cells of a code symbol increases, it is likely to be difficult for the communication terminal to read the code symbol when displayed on the display unit. In particular, as the size of the display unit of the operation device decreases, it is likely to be difficult for the communication terminal to read the code symbol successfully. In the second embodiment, the operation device generates two code symbols in which information can be divided and recorded. Therefore, it is easier for the communication unit to read the code symbols displayed on the display unit. If the URL and the information regarding an error are recorded in one code symbol, it is likely that the communication terminal cannot access the web service due to an influence that information other than the URL being recorded in the code symbol. In the second embodiment, the operation device generates two code symbols in which the information is divided and separately recorded. Therefore, the communication terminal can smoothly access the web service.

In the operation device according to the second embodiment, the display processing unit displays the second code symbol on the display unit after the display processing unit erases the first code symbol displayed on the display unit.

As such, the operation device does not simultaneously display the first and second code symbols on the display unit. Therefore, the operation device can display each of two code symbols with large sizes on the display unit rather than simultaneously displaying two code symbols of smaller size. Even if the display unit is small, the code symbol displayed on the display unit can be easily read by the communication unit.

The information processing device according to the second embodiment includes a communication processing unit configured to acquire information regarding the error read from a code symbol displayed on the operation device by the communication terminal based on access of the communication terminal to a web service related to an error occurring in an operation device. The information processing device includes a storage processing unit configured to store the information regarding the error in a storage unit.

The user can check the countermeasure method for resolving the error occurring in the operation device using the communication terminal by accessing the web service. Therefore, the operability of the access of the user to the web service using the communication terminal is maintained. The information processing device can acquire information regarding the error based on the access to the web service. The information processing device can collect information regarding the error without requiring a special input by the user. Therefore, the information processing device can collect more information regarding errors. As such, the information processing device can collect the information regarding the error without requiring a special input by the user while maintaining the operability of the access to the web service by the user using the communication terminal. Accordingly, while the information processing device can allow the user to check the countermeasure method for the error occurring in the operation device, the information processing device can collect the information regarding the error.

In the information processing device according to the second embodiment, the storage control unit stores information regarding an error with regard to every web service related to each error.

Accordingly, the information processing device can manage the information regarding the errors in association with the web services related to the errors. Therefore, for example, the provider of the web service can perform the above-described analysis for each web page.

In the information processing device according to the second embodiment, the communication processing unit outputs a notification to the communication terminal for prompting reading of a code symbol.

Other Embodiments

In the first embodiment, the 2-dimensional code symbol may include a setting in which the portable terminal 2 outputs error information to the server 3 based on access of the portable terminal 2 to a web service of an URL. In the second embodiment, the second 2-dimensional code symbol may include a setting in which the portable terminal 2 outputs error information to the server 3 based on reading of the error information by the portable terminal 2.

In an embodiment, the printer 1 is an operation device, but embodiments are not limited thereto. In other examples, the operation device may be a multifunction peripheral (MFP). The operation device is not limited to a device that has a printing function and may be any of various devices performing an operation.

The operation device may be one device that implements a function or may be configured as a plurality of devices with functions that are distributed. The information processing device may be one device that implements each described function or may be a plurality of devices among which functions are distributed.

The embodiments include not only a device but also a method implemented by the device. An embodiment also includes a program capable of causing a computer or device to execute each described function. Such an embodiment may be included in a non-transitory, computer-readable recording medium storing such a program.

Such a program may be stored in a device before or after transfer of the device. In the latter case, the program may be transferred via a network or the program recorded on a recording medium may be transferred. The recording medium may be any type of medium such as a CD-ROM or a memory card that can store a program and can be read by a computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operation device, comprising:
a display screen;
a storage unit; and a control unit configured to:
  detect an error of the operation device;
  generate a first code symbol for display on the display screen, the first code symbol encoding a URL of a web service associated with the detected error in the storage unit, the web service being provided by a web server;
  display the generated first code symbol on the display screen; and
  generate a second code symbol for display on the display screen after the first code symbol is generated, the second code symbol encoding information related to the detected error to be provided to the web service.

2. The operation device according to claim 1, wherein the control unit is further configured to:
  display the generated second code symbol on the display screen after the first code symbol has been displayed on the display screen.

3. The operation device according to claim 2, wherein the first code symbol is erased from the display screen before the display of the second code symbol on the display screen.

4. The operation device according to claim 1 wherein the control unit is further configured to:
  display a prompt to press a next button on the display screen, and
  the control unit generates the second code symbol after the next button has been pressed.

5. The operation device according to claim 1, wherein the display screen is a liquid crystal display.

6. The operation device according to claim 1, further comprising:
  a printing unit configured to form images on a printable medium.

7. A printer, comprising:
  a display screen;
  a storage unit;
  a printing unit configured to form images on a printable medium; and
  a control unit configured to:
    detect an error of the printing unit;
    generate a first code symbol for display on the display screen, the first code symbol encoding a URL of a web service associated with the detected error in the storage unit, the web service being provided by a web server;
    display the generated first code symbol on the display screen; and
    generate a second code symbol for display on the display screen after the first code symbol is generated, the second code symbol encoding information related to the detected error to be provided to the web service.

8. The printer according to claim 7, wherein the control unit is further configured to:
  display the generated second code symbol on the display screen after the first code symbol has been displayed on the display screen.

9. The printer according to claim 8, wherein the first code symbol is erased from the display screen before the display of the second code symbol on the display screen.

10. The printer according to claim 7, wherein
  the control unit is further configured to:
    display a prompt to press a next button on the display screen, and
  the control unit generates the second code symbol after the next button has been pressed.

11. The printer according to claim 7, wherein the display screen is a liquid crystal display.

12. A user-help processing system, comprising:
  an operation device;
  a portable terminal connectable to a communication network; and
  a web server connected to a communication network, wherein
  the operation device includes:
    a display screen;
    a storage unit; and
    a control unit configured to:
      detect an error of the operation device;
      generate a first code symbol for display on the display screen, the first code symbol encoding a URL of a web service associated with the detected error in the storage unit, the web service being provided by the web server;
      display the generated first code symbol on the display screen; and
      generate a second code symbol for display on the display screen after the first code symbol is generated, the second code symbol encoding information related to the detected error to be provided to the web service.

13. The user-help processing system according to claim 12, wherein the control unit is further configured to:
  display the generated second code symbol on the display screen after the first code symbol has been displayed on the display screen.

14. The user-help processing system according to claim 13, wherein the first code symbol is erased from the display screen before the display of the second code symbol on the display screen.

15. The user-help processing system according to claim 12, wherein
  the control unit is further configured to:
    display a prompt to press a next button on the display screen, and
  the control unit generates the second code symbol after the next button has been pressed.

16. The user-help processing system according to claim 12, wherein the display screen is a liquid crystal display.

17. The user-help processing system according to claim 12, wherein the operation unit further includes:
  a printing unit configured to form images on a printable medium.

* * * * *